No. 657,797. Patented Sept. 11, 1900.
I. D. STEVENS.
FORCED FEED END GATE BROADCAST SEEDER.
(Application filed Aug. 25, 1899.)
(No Model.) 3 Sheets—Sheet 1.
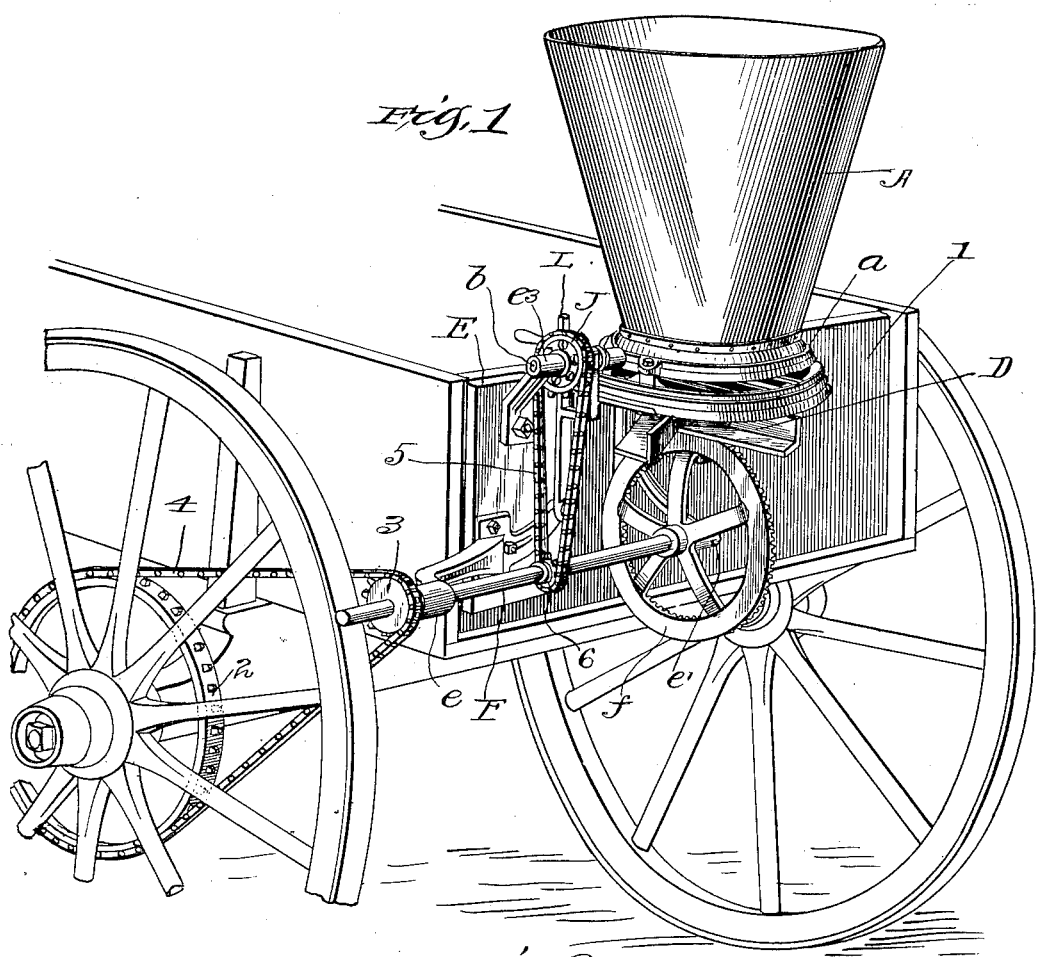
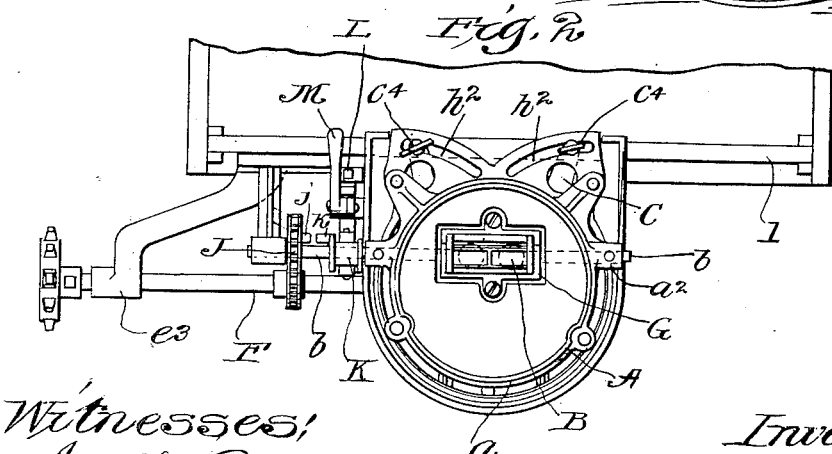

No. 657,797. Patented Sept. 11, 1900.
I. D. STEVENS.
FORCED FEED END GATE BROADCAST SEEDER.
(Application filed Aug. 25, 1899.)
(No Model.) 3 Sheets—Sheet 2.
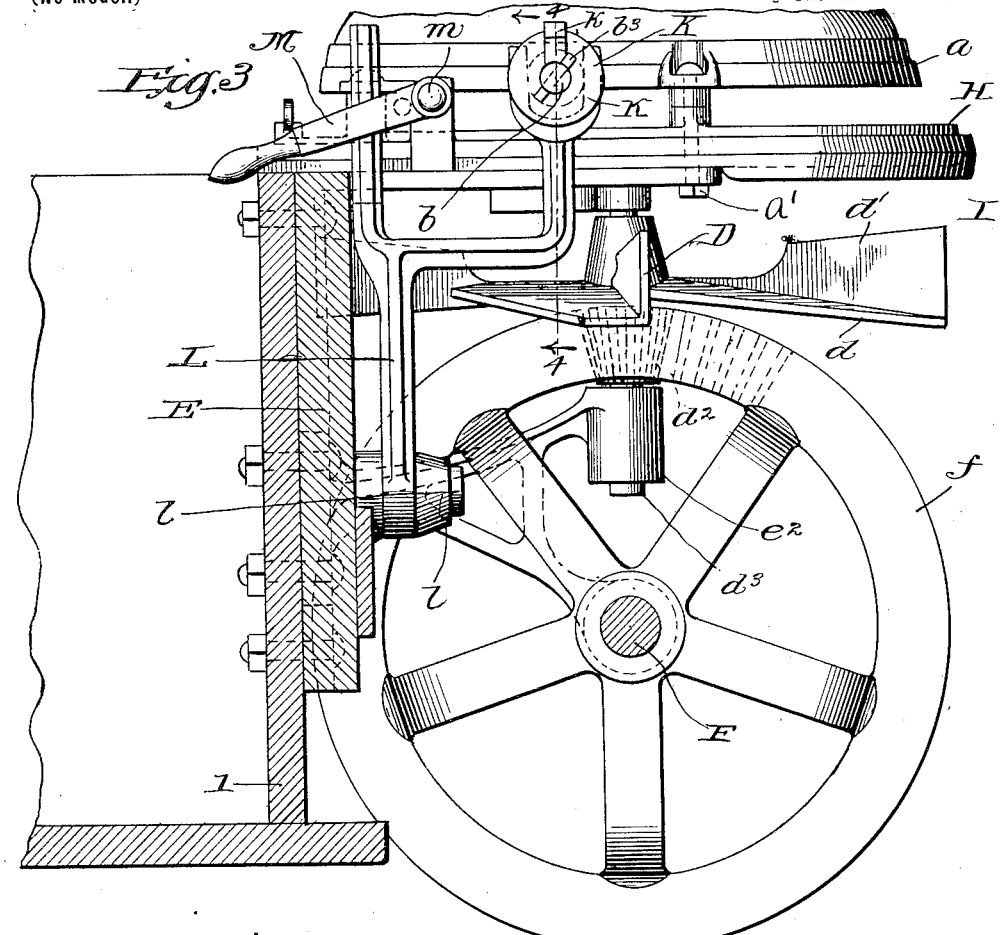
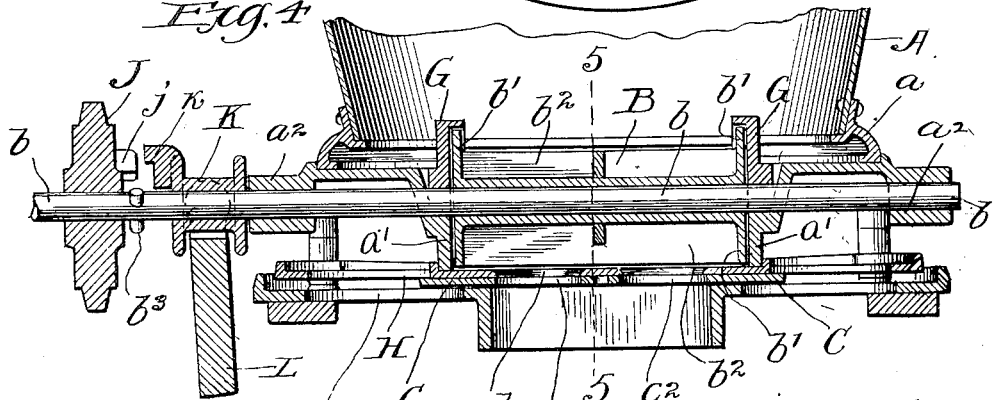
Witnesses:
Ira D. Perry
J. B. Weir.
Inventor
Irving D. Stevens
By Page & Durand
Attys No. 657,797. Patented Sept. 11, 1900.
I. D. STEVENS.
FORCED FEED END GATE BROADCAST SEEDER.
(Application filed Aug. 25, 1899.)
(No Model.) 3 Sheets—Sheet 3.
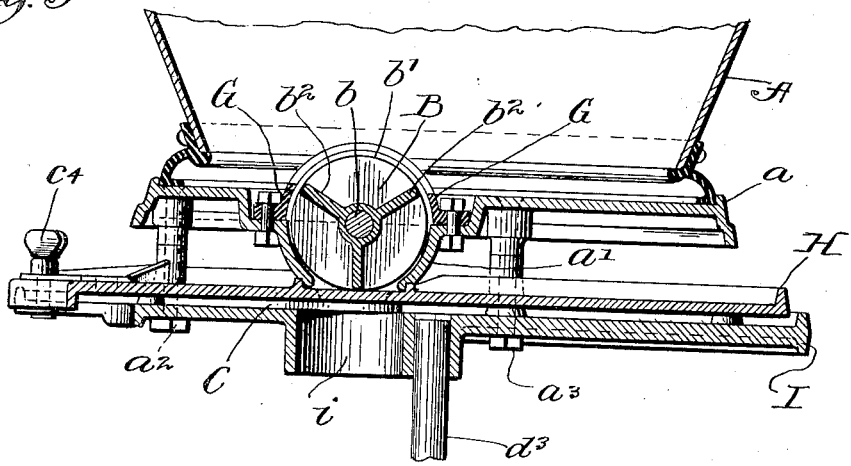
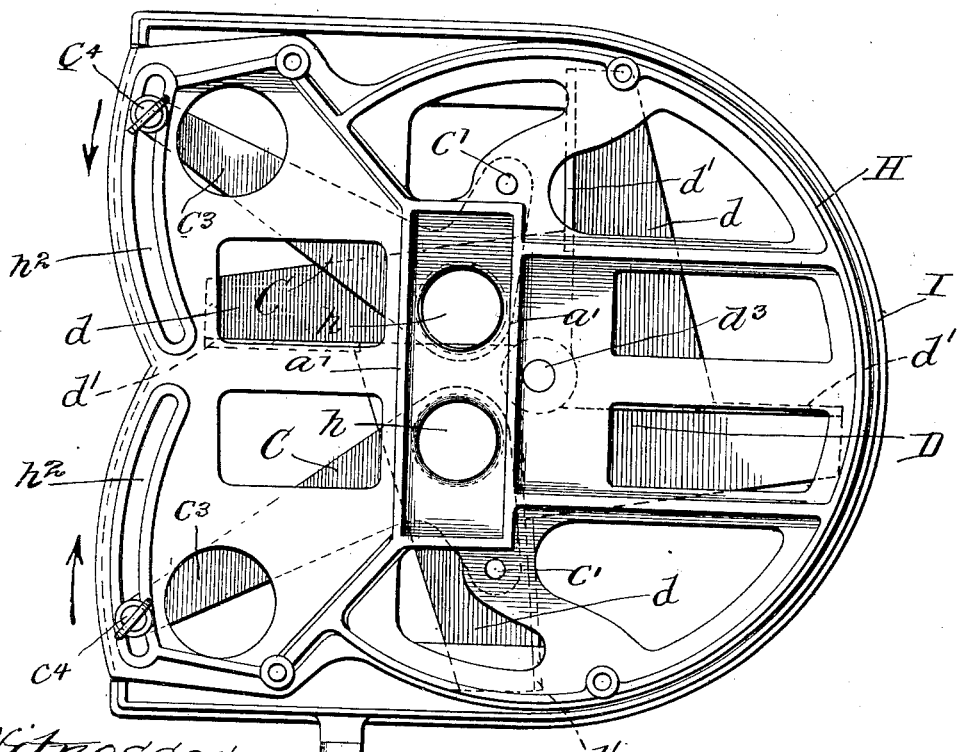

UNITED STATES PATENT OFFICE.

IRVING D. STEVENS, OF JOLIET, ILLINOIS.

FORCED-FEED END-GATE BROADCAST SEEDER.

SPECIFICATION forming part of Letters Patent No. 657,797, dated September 11, 1900.

Application filed August 25, 1899. Serial No. 728,418. (No model.)

*To all whom it may concern:*

Be it known that I, IRVING D. STEVENS, a citizen of the United States, residing at Joliet, in the county of Will, State of Illinois, have invented a certain new and useful Improvement in Forced-Feed End-Gate Broadcast Seeders, of which the following is a specification.

My invention relates to a form of seeding-machine adapted to effect what is commonly known as a "broadcast" distribution of the seed, and more particularly to machines of this character which are adapted to be mounted for operation upon the end-gate of an ordinary wagon.

Some of the principal objects of my invention are to provide a broadcast seeding-machine which may be easily and advantageously operated and by which the seed may be evenly and uniformly distributed or scattered upon the ground; to effectively feed the seed from the hopper to the rotary seed-wheel and also to provide means whereby such feeding of the seed may be varied or controlled at will; to provide improved means for controlling the operation of the machine; to provide a novel and highly-effective form of rotary seed-wheel; to generally simplify and improve the construction, and to thereby reduce the cost of manufacture; to provide an arrangement whereby the discharge of the seed may be interrupted without cramping or straining the power-transmitting devices which connect the rotary feeder and rotary seed-wheel with the rear axle, and to provide certain details and features of construction tending to increase the general efficiency and to render a machine of this character serviceable and in every way satisfactory and effective.

To the foregoing and other useful ends my invention consists in matters hereinafter set forth and claimed.

Figure 1 is a view illustrating in perspective a forced-feed end-gate broadcast seeder embodying the principles of my invention and showing the same attached to the end gate or board of an ordinary wagon. Fig. 2 is a plan of the seeding-machine shown in Fig. 1, the hopper shown in the preceding figure being removed for convenience of illustration. Fig. 3 is a view on an enlarged scale illustrating the seeder in side elevation, the upper portion of the hopper being broken away. Fig. 4 is a longitudinal and vertical section through the rotary feeder and adjacent parts on line 4 4 in Fig. 3. Fig. 5 is a transverse section through the rotary feeder and adjacent parts on line 5 5 in Fig. 4. Fig. 6 is an enlarged plan view of the seeder with the hopper and rotary feeder removed and illustrating the construction and arrangement of the two reducing-valves C, which control the downward discharge of seed from the pockets of the rotary feeder, and also showing, partly in full and partly in dotted lines, the rotary seed-wheel, which is arranged immediately below the said valves.

The seeding-machine thus illustrated comprises in general a hopper A, a rotary feeder B, a couple of reducing-valves C, and a rotary seed-wheel D, it being observed that both the latter and the rotary feeder are driven from the rear axle through the medium of suitable power-transmitting devices. In Fig. 1 it will be seen that the seeder is supported by a bracket E, which is bolted or otherwise secured to the end-gate 1 of the wagon and which is provided with suitable bearings for the various rotary shafts, &c., comprised in the construction of the seeder.

The base or bottom portion of the hopper is preferably composed of a plate or casting $a$, to which latter the body of the hopper can be riveted or otherwise suitably secured, and such base or bottom portion is preferably formed with a cup or cavity $a'$, adapted to receive the rotary feeder B. It will be observed that the said rotary feeder is mounted upon a shaft $b$, which extends transversely to the line of progression—that is to say, transversely to the length of the wagon. The said shaft can be mounted in bearings $a^2$, formed integral with the casting $a$.

Various forms of rotary feeder may be employed for feeding the seed from the hopper to the seed-wheel, but as a matter of further improvement I provide a feeder consisting of a couple of annular end walls or disks $b'$, which are connected by radial webs or wings $b^2$. The said radial webs or wings in effect provide the rotary feeder with a plurality of pockets adapted to receive and carry the seed and which then discharge the same onto the upper surface of the rotary seed-wheel. A cap G is provided and arranged to cover the said rotary feeder. This cap has its top or upper wall cut away to an extent to permit the seed to enter the pockets of the feeder, and with this arrangement it will be observed that the discharge of seed from the bottom of the hopper is dependent entirely upon the rotation of the feeder—that is to say, the construction is such that no seed will escape from the hopper when the feeder is not in motion. The opening in the upper wall of this cap G preferably extends the full length of the latter and is of such character that the periphery of the rotary feeder—that is to say, the radial wings of the feeder—extend up into the interior of the hopper, so as to permit the feeder to practically revolve within the seed. This arrangement insures a free and unrestricted passage or transfer of the seed from the hopper to the pockets of the rotary feeder.

Immediately below the base of the hopper are a couple of open-work plates or castings H and I, between which are arranged the two swinging reducing-valves C and to which the hopper is bolted by means of bolts $a^3$. The plate or casting H forms the bottom of the cup or cavity within which the rotary feeder is arranged, and to permit the desired discharge of seed the said plate or casting is provided with a couple of discharge-openings $h$. These openings, which are of course directly beneath the rotary feeder, are preferably round or annular in form and are preferably arranged at either side of the median line. It will also be seen that the bottom plate or casting I is provided with an opening $i$, which, together with the openings $h$, permits a free and unrestricted downward discharge of the seed. The reducing-valves C are, as previously stated, arranged to work between the opposing surfaces of the plates or castings H and I, are pivoted at $c'$, and are provided with openings $c^2$, preferably corresponding in size and form to the openings $h$. It will also be seen that these reducing-valves, which are flat in form, are also provided with forwardly-extending arms $c^3$, which latter are provided at their ends with thumb-screws or bolts $c^4$. The said thumb-screws or bolts are arranged to swing or travel in segmental slots $h^2$, which are preferably formed in the plate or casting H. In this way the size of the two discharge-openings $h$ can be varied at will, it being obvious that such variation can be accomplished by simply swinging or adjusting the two valves into position to bring their openings more or less out of register with the openings $h$. The thumb-screws or bolts permit the valves to be locked in any particular or desired position, and as the valves are not connected either one may be adjusted independently of the other.

The rotary seed-wheel D to which the seed is fed and by which a broadcast distribution of the same is then effected through centrifugal force is also a feature of improvement and is characterized by a formation which insures a proper scattering of the seed. This wheel is therefore preferably provided with horizontal blades $d$, which have a slight downward dip and which serve to provide the wheel with a central surface which is substantially flat and horizontal and to which the seed is delivered from the pockets of the rotary feeder. It will also be seen that the said blades $d$ have their rear edges turned up to provide a plurality of vertical webs $d'$, which extend inwardly and terminate at a point substantially midway between the center and the periphery of the wheel—that is to say, at points intermediate of the outer and inner end portions of the blades $d$. With this construction and formation the seed will be first delivered to the central receiving-surface of the wheel and will then travel outward and be thrown or projected by centrifugal force from the outer edges of the vertical webs $d'$. By terminating the webs $d'$ at points somewhat distant from the center of the wheel it will be seen that all seed delivered to the wheel will be brought into contact with the forward surfaces of such webs, and consequently that all seed will be subjected to the same degree of centrifugal force and will be thrown or projected outwardly the desired distance from the wagon. The arrangement is preferably such that the seed is delivered to the wheel at a point just forward of its axis, and at this juncture it will be seen that the openings in the reducing-valves are swung toward and away from the center of the seed-wheel, thereby varying the size of the two openings $h$ in directions which are substantially radial to the axis of such wheel. In a broadcast seeder of this character it is preferable to deliver the seed to the seed-wheel at a point or points near the latter's center, and for this reason I have pivoted the reducing-valves in such manner that they effect a reduction of the discharge in the manner just stated.

While both the rotary feeder and the rotary seed-wheel may be driven in any suitable manner, it is preferable and desirable that the same be driven from one of the rear vehicle-wheels through the medium of suitable power-transmitting devices. To such end therefore I provide a horizontal shaft F and mount the same for rotation in bearings $e\ e'$. This shaft can be driven from one of the rear vehicle-wheels through the medium of sprockets 2 and 3 and sprocket-chain 4. The rotary seed-wheel can be driven from the shaft F through the medium of bevel-gears $f$ and $d^2$, it being observed that the short shaft $d^3$ upon which the seed-wheel is mounted is supported by a bracket-bearing $e^2$. A similar bracket-bearing $e^3$ is also provided for the outer end of the rotary feeder-shaft $b$. The said rotary feeder-shaft can also be driven from the shaft F, and to this end I provide the feeder-shaft with a sprocket J and connect the same with the shaft F through the medium of a chain 5 and a sprocket 6. In this way it will be seen that I effect the desired rotation of both the feeder and the seed-wheel from the rear axle, and in this way render the operation of the seeder dependent upon the forward motion of the wagon. I find it desirable, however, to make provision for stopping the rotation of the feeder without stopping the progress of the wagon, and accordingly I have arranged a clutch device intermediate of the feeder and the shaft F. This clutch device may be of any known or approved form; but as a matter of further and special improvement I provide the sprocket J with a lug $j$ and provide the shaft $b$ with a transverse pin $b^3$. Loosely mounted upon said shaft is a spool-shaped clutch member K, and by referring to Figs. 2 and 4 it will be seen that this clutch member is provided with a lug $k$. The sprocket J is also loosely mounted upon the shaft $b$, but by shifting the clutch member K outward to an extent to permit the lug $j$ to engage the lug $k$ it will be seen that the two will then revolve in unison and by engaging the pin $b^3$ will effect the desired rotation of the shaft $b$. For the purpose of readily shifting the clutch member K, I provide a two-pronged lever L, which is pivoted at $l$, and which has its rear or outer prong forked and adapted to engage the said spool-shaped clutch member K. With this arrangement the clutch member K can be thrown into or out of engagement with the sprocket J by simply swinging the lever L about its point of pivotal connection with the bracket E, and as a simple and effective device for locking the said lever in either of its two positions I provide a swinging arm or lever M. This swinging arm or lever M is preferably pivoted to the body-casting $m$ and is adapted and arranged to be swung into the path of the inner or forward prong of the lever L. For instance, in Fig. 3 the clutch member K is illustrated as being locked out of engagement with the sprocket J by reason of the arm or lever M being swung to a position outside of the forward prong of the lever L; but it will readily be seen that such swinging arm or lever can be swung into a vertical position to permit the clutch to be operated, and that such arm can then be swung back to a position inside of the forward prong of the lever L, thereby locking or maintaining the latter in a position to hold the clutch member K in contact with the sprocket J. It is obvious, however, that various forms of driving and clutch mechanisms may be employed for this purpose, and for this reason I do not limit myself to the device shown and described.

In practice the operation of my invention is as follows: The seed to be distributed is deposited within the hopper and the clutch mechanism is then operated for the purpose of starting the rotary feeder. The reducing-valves are adjusted to the desired positions, and the seed discharged from the pockets of the rotary feeder will be caught and projected outwardly by the rotary seed-wheel D; and at this juncture it will be observed that the webs $d$ of the seed-wheel are substantially radial, though the same may, if desired, be arranged tangentially substantially in the manner shown in Fig. 6. In either event, however, these webs may be regarded as being substantially radial in form and arrangement, and it is obvious that a slight variation one way or the other will not constitute a departure from the spirit of my invention.

A broadcast seeding-machine of the foregoing description is simple and effective, as the rotary feeder practically revolves in the seed, thus insuring at all times a uniform and even discharge of the seed. The segmental slots $h^2$ can of course be provided with graduated plates or other similar devices for enabling the operator to readily determine the proper amount of adjustment to be given the valves C; and as a further advantage of my improved construction and arrangement it will be seen that the operation of the clutch—that is to say, the starting and stopping of the rotary feeder—is easily and advantageously accomplished and without cramping or flexing either of the two sprocket-chains employed as mediums of connection between the feeder and rear axle.

What I claim as my invention is—

1. The combination of the hopper, a rotary feeder arranged at the bottom of said hopper, feed ports or openings below said feeder, pivoted reducing-valves controlling said ports or openings, a rotary seed-wheel located below said valves and arranged to receive the seed from said ports or openings, and means for rotating said feeder and seed-wheel, substantially as described.

2. In a seeding-machine and in combination with a hopper and a broadcasting device arranged beneath the said hopper, a rotary feeder arranged intermediate of the hopper and broadcasting device and provided with a plurality of radial wings which, in effect, provide the feeder with a plurality of pockets which carry the seed from the hopper and deliver it to the said broadcasting device and which extend up into the interior of the hopper, substantially as described.

3. A broadcasting-seeder comprising a hopper having its bottom portion constructed or formed with a cup or cavity, a rotary feeder arranged for rotation within the said cup and provided with end walls or disks and intermediate radial wings which extend up into the interior of the hopper and which, in effect, provide the rotary feeder with a plurality of pockets, and a rotary seed-wheel arranged beneath the said hopper and adapted to receive the seed from the pockets of the said rotary feeder, substantially as described.

4. In a broadcast seeding-machine a hopper having its bottom portion constructed or formed with a cup or cavity, the bottom of which latter is provided with a couple of openings, a rotary feeder arranged for rotation within the said cup or cavity and provided with pockets, a broadcasting device arranged beneath the said hopper and adapted to receive the seed from the pockets of the rotary feeder, and a couple of reducing-valves for controlling the downward escape of the seed through the said openings in the bottom of the said cup or cavity, the said rotary feeder being arranged for rotation about a horizontal axis which is transverse to the line of progression, substantially as described.

5. In a broadcast seeding-machine, and in combination with a hopper having its bottom portion constructed or formed with a cup or cavity $a'$, a broadcasting device arranged beneath the said hopper, the rotary feeder B constructed and operating within the said cup or cavity substantially as and for the purpose described.

6. A broadcast seeding-machine adapted to be attached to the end-gate of a wagon and comprising a hopper, a broadcasting device arranged beneath the said hopper, a rotary feeder arranged intermediate of the hopper and the broadcasting device, both the said feeder and the broadcasting device being driven from one of the rear wagon-wheels through the medium of suitable power-transmitting devices, and a clutch mounted upon the shaft of the said rotary feeder whereby the rotation of the latter may be stopped without stopping the wagon or the said broadcasting device.

7. A broadcast seeding-machine adapted to be attached to the end-gate of a wagon and comprising a hopper, a rotary seed-wheel suitably mounted and arranged beneath the said hopper, and a rotary feeder arranged intermediate of the hopper and rotary seed-wheel, a horizontal shaft which is driven from one of the rear vehicle-wheels through the medium of a sprocket-chain and from which are driven both the rotary feeder and rotary seed-wheel, the medium of connection between said shaft and rotary feeder consisting of sprockets and sprocket-chain, and the shaft of the said rotary feeder being provided with a clutch which permits the rotation of the feeder to be stopped without stopping the wagon and without subjecting either of the two sprocket-chains to lateral shift, substantially as described.

8. A forced-feed end-gate broadcast seeder comprising a hopper, a rotary seed-wheel arranged beneath the said hopper, a rotary feeder arranged intermediate of the hopper and seed-wheel, both the latter and the said rotary feeder being driven from one of the rear wagon-wheels through the medium of suitable power-transmitting devices, a clutch arranged upon the shaft of the said rotary feeder for the purpose of permitting the latter to be stopped or started at will, a swinging lever adapted to engage one member of the said clutch, and a pivoted locking arm or lever adapted and arranged to be swung into the path of the latter, which engages one member of the said clutch, and whereby said member may be locked either into or out of engagement with the other member of said clutch, substantially as described.

9. A forced-feed end-gate broadcast seeding-machine comprising a hopper, a rotary seed-wheel arranged beneath the said hopper, a rotary feeder arranged at a suitable point between the hopper and the seed-wheel, both the latter and the said rotary feeder being driven from one of the rear wagon-wheels through the medium of suitable power-transmitting devices, a clutch arranged upon the shaft of the said rotary feeder, a swinging lever L arranged to engage the said clutch, and a locking arm or lever M, substantially as and for the purpose described.

10. A broadcast seeding-machine comprising in combination a hopper, a rotary seed-wheel arranged beneath the said hopper, a feeding device for feeding the seed to the said rotary seed-wheel, a couple of openings intermediate of the feeding device and rotary seed-wheel and through which the seed is delivered from the former to the latter, a couple of reducing-valves for controlling the said openings and whereby each of the latter may be reduced in area at will, such reduction of the size of said openings being in directions radial, or substantially radial, to the center of the said rotary seed-wheel.

11. A broadcast seeding-machine comprising a hopper having its bottom provided with a couple of openings, a rotary seed-wheel arranged beneath the said hopper and adapted to receive the seed as it escapes downwardly through said openings, and a couple of swinging reducing-valves C C for controlling the said openings, and whereby the size of the latter may be varied at will, substantially in the manner and for the purpose set forth.

12. In a forced-feed end-gate broadcast seeder, and in combination with a hopper, a rotary seed-wheel arranged beneath the said hopper, a rotary feeder B arranged to feed the seed through a couple of openings $h$, a couple of reducing-valves for controlling the escape of the seed through the said openings, said openings and reducing-valves being located between the said feeder and the said seed-wheel, substantially as described.

13. In a forced-feed end-gate broadcast seeder, and in combination with a hopper, rotary seed-wheel and feeding device, a couple of swinging reducing valves, provided with openings for controlling the downward escape of the seed and also provided with forwardly-extending arms, the end of each arm being provided with a thumb-screw or bolt which swings or travels in a segmental slot formed in the body of the machine, substantially as described.

14. In a forced-feed end-gate broadcast seeder, and in combination with a hopper, rotary seed-wheel and feeding device, a couple of swinging reducing-valves provided with openings for controlling the downward escape of the seed and provided also with forwardly-extending arms, the end of each arm being provided with a thumb-screw or bolt which swings or travels in a segmental slot formed in the body-casting, and said valves being mounted in such manner that their openings swing in directions toward and away from the center or axis of said seed-wheel, substantially as and for the purpose described.

15. A seeding-machine comprising a suitable hopper, a rotary seed-wheel arranged beneath the said hopper and rotating about a vertical axis, the said wheel being provided with a central receiving-surface and also with webs which extend inwardly and terminate at points between the center and the periphery of the said wheel, and the opening or openings through which the seed is fed from the hopper to the seed-wheel being located directly above the said central receiving-surface of said wheel, substantially as and for the purpose set forth.

16. A forced-feed end-gate broadcast seeder comprising a hopper or other receptacle for holding the seed, a rotary feeder arranged at the bottom of the said hopper and provided with pockets for carrying the seed, one or more reducing-valves arranged beneath the said rotary feeder and adapted to control the downward escape of the seed from the pockets of the feeder, a rotary seed-wheel arranged for rotation about a vertical axis beneath the said reducing-valves, the said seed-wheel being provided with a central receiving-surface to which is delivered the seed from the pockets of the rotary feeder and also with vertical and inwardly-extending webs which terminate at points substantially midway between the center and periphery of the said seed-wheel, substantially as described.

17. The combination of a hopper, a rotary feeder B, reducing-valves C located immediately below said feeder, and a rotary seed-wheel D located immediately below said reducing-valves, all constructed, organized and operating substantially as and for the purpose set forth.

18. In a forced-feed end-gate broadcast seeder and in combination with a suitable hopper and a rotary seed-wheel arranged beneath said hopper, a feeding device arranged intermediate of the hopper and said wheel and extending into the interior of the said hopper and provided with a plurality of pockets which are successively brought into position to be filled with seed from the hopper and which are then successively brought into a position to discharge their contents onto the said rotary seed-wheel, and means for controlling the discharge of seed from the pockets of the said feeding device.

19. A forced-feed end-gate broadcast seeder comprising a suitable hopper, a centrifugal broadcasting device arranged beneath the said hopper, a couple of openings in the bottom of said hopper arranged at either side of the median line and at a point somewhat forward of the axis of said centrifugal broadcasting device, a feeding device for feeding the seed downward from the hopper through the said openings, and independently adjustable reducing-valves for varying the area or size of said openings, such variation in size of the two openings being in directions substantially toward and away from the axis of the said centrifugal broadcasting device, substantially as and for the purpose described.

20. In a forced-feed end-gate broadcast seeder, and in combination with a suitable hopper and a centrifugal broadcasting device, a rotary feeder mounted for rotation in a cup or cavity formed in the bottom of said hopper, means for driving both the feeder and the centrifugal broadcasting device, and a cap arranged to cover the said rotary feeder and having its top or upper wall which extends upwardly into the interior of the hopper cut away to provide an opening through which the seed may enter the pockets of the said rotary feeder, which latter by this arrangement revolves practically within the seed at the bottom of the hopper, substantially as described.

21. In a broadcast seeding-machine and in combination with a suitable hopper for holding the seed, a rotary seed-wheel which is arranged beneath the said hopper and which is provided with horizontal blades having a slight outward and downward dip, the rear edges or marginal portions of the said blades being turned up to provide a plurality of webs which are substantially vertical and which extend inwardly and terminate at points between the center and periphery of the said wheel, so as to provide a central receiving-surface and one or more openings for feeding the seed directly to said surface.

22. In a broadcast seeding-machine, and in combination with a suitable hopper for holding the seed, a rotary seed-wheel which is arranged beneath the said hopper, and which is provided with tangential blades having a slight outward and downward dip, the rear edges or marginal portions of said blades being turned up to provide a plurality of slightly-tangential webs which are vertical, or substantially vertical, and which extend inwardly and terminate at points between the center and periphery of the wheel, substantially as shown and described and for the purpose stated.

IRVING D. STEVENS.

Witnesses:
ARTHUR F. DURAND,
AGNES A. DEVINE.